F. E. CONANT.
COW TAIL HOLDER.
APPLICATION FILED MAY 26, 1911.
1,030,462.
Patented June 25, 1912.
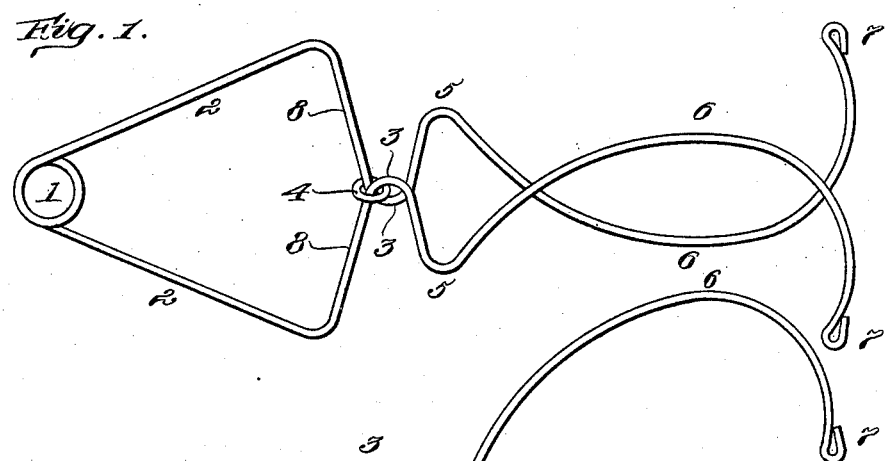
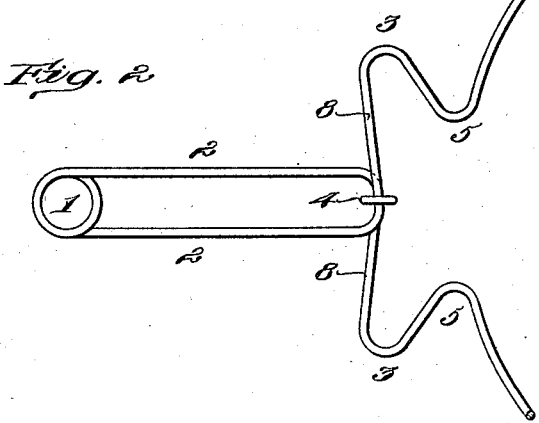
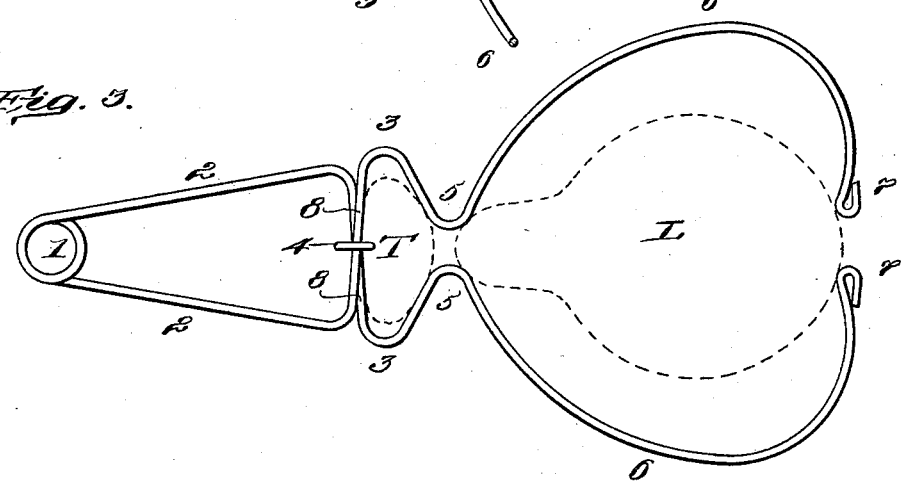

UNITED STATES PATENT OFFICE.

FRANK E. CONANT, OF TOWNSEND HARBOR, MASSACHUSETTS.

COW-TAIL HOLDER.

1,030,462.

Specification of Letters Patent. Patented June 25, 1912.

Application filed May 26, 1911. Serial No. 629,545.

*To all whom it may concern:*

Be it known that I, FRANK E. CONANT, a citizen of the United States, and resident of Townsend Harbor, in the county of Middlesex and State of Massachusetts, have invented new and useful Improvements in Cow-Tail Holders, of which the following is a specification.

My invention relates to that type of fastening device commonly called a cow-tail holder which is employed by dairy men for securing a cow's tail so that it cannot be switched about during the milking of the cow.

The cow-tail holders heretofore provided have proved unsatisfactory in use for the reason, among others, that they cannot be readily attached and detached.

It is the object of this invention to provide a holder which shall be strong, simple and readily attachable and detachable requiring but one hand of the user for its manipulation.

Referring to the drawings which illustrate an embodiment of my invention.—Figure 1 is a plan view of my improved holder in normal closed position; Fig. 2 is a similar view showing the holder jaws in distended position; and Fig. 3 is a similar view showing the holder in operative position, the leg and tail of the cow being indicated by dotted lines.

My improved holder is preferably made of a single piece of wire bent at or about its center to form a spring 1 normally distending the handle arms 2; the extensions from each handle arm cross each other forming the crossed offsets 8 and each extension is bent as at 3, 5 and 6 to form two holding jaws and each has a converging end 7. The jaw formed by the bends 3 and reverse bends 5 is the tail-holding jaw, and that formed by the bends 6 and converging ends 7, the leg-holding jaw. A ring or other suitable stop, 4, engages the bends 3 when the holder is in normal position, and prevents the two branches of the device from springing too wide apart.

It will be clear that the spring 1 normally distends the holding arms 2 and holds the tail and leg-holding jaws closed as shown in Fig. 1. It will be equally clear that because of the crossed offsets 8 the movement of the handle arms toward each other opens the jaws and that when they are released and permitted to separate, the jaws are closed.

In securing the cow's tail, the user grasps the holder in one hand and presses the handle arms together, thus opening the jaws to their widest extent as shown in Fig. 2. When the jaws have been passed around the tail and leg of the cow, the handle arms are allowed to separate so that the jaws close around the leg and tail of the cow as shown in Fig. 3. To remove the device, the user again grasps the handle arms and again brings them together thus opening the jaws to their widest extent, so that the device may be readily removed, and when so removed the jaws are open ready to be slipped over the tail and leg of the next cow to be milked.

The arrangement of the pivotal closing spring at the extreme end of the holder, with handles between the spring and the crossed parts of the jaws, makes it possible to effect a wide distention of the jaws themselves by the grasping action of one hand, and the wide range of angular movement of the jaws thus secured allows the provision of overlapping ends of the leg-holding parts when the holder is in service, to further insure security.

As the spring 1 is at one end of the holder, and acts as the pivot on which the handle and attached jaws move, the movement of the handles which lie between the spring 1 and the jaws causes the jaws to open as widely as possible with any given length of handle and jaws.

I claim:

1. A cow-tail holder comprising a spring at one end of the holder, two holding jaws, each consisting of a tail-engaging bend and a leg-engaging bend, two handle arms, extending from the spring to the holding jaws, and normally distended by the spring, said jaws crossing each other where the tail-engaging bends join their respective handle arms, the handles and their respective holding jaws movable on the spring as a pivot, whereby separation of the handle arms by the spring causes closure of the jaws.

2. A cow-tail holder comprising the spring 1, handle arms 2, holding jaws consisting of extensions from the handle arms, said extensions bent as at 3 and 6, reverse bends 5, converging ends 7, and crossed offsets 8, the spring constituting the pivot on which the handle arms and jaws move to separate and close, the spring normally separating the handle arms 2 and closing the holding jaws.

3. A cow tail holder comprising a spring at one end of the holder, two holding jaws each consisting of a tail-engaging bend and a leg-engaging bend, two handle arms extending from the spring to the holding jaws, and normally distended by the spring, said jaws crossing each other where the tail engaging bends join their respective handle arms, a ring embracing the two crossing jaws, the handles and their respective holding jaws movable on the spring as a pivot and the crossed portions of the jaws slidable one on the other, whereby separation of the handle arms by the spring causes closure of the jaws.

4. A cow tail holder comprising the spring 1, handle arms 2, holding jaws consisting of extensions from the handle arms, said extensions bent as at 3 and 6, reverse bends 5, converging ends 7, crossed offsets 8, holding ring 4, the spring constituting the pivot on which the handle arms and jaws move to separate and close, the spring normally separating the handle arms 2 to close the holding jaws.

5. A cow tail holder comprising a spring at one end of the holder, two jaws each consisting of a tail-engaging bend and a leg-engaging bend, the ends of the leg-engaging bends normally overlapping, handle arms extending from the spring to the holding jaws, and normally distended by the spring, said jaws crossing each other where the tail-engaging bends join their respective handle arms, the handles and their respective holding jaws movable on the spring as on a pivot, and the crossed portions of the jaws slidable one on the other, whereby separation of the handle arms by the spring causes closure of the jaws.

Signed by me at Boston, Mass., this 20th day of May, 1911.

FRANK E. CONANT.

Witnesses:
ODEN ROBERTS,
CHARLES D. WOODBERRY.

Copies of this patent may be obtained for five cents each, by addressing the "Commissioner of Patents, Washington, D. C."